Oct. 9, 1962  H. A. STILLE  3,057,371

BALL COCK VALVE

Filed Oct. 23, 1959

INVENTOR
HENRY A. STILLE

BY Price and Heneveld

ATTORNEYS

United States Patent Office
3,057,371
Patented Oct. 9, 1962

3,057,371
BALL COCK VALVE
Henry A. Stille, Grand Haven, Mich., assignor to Grand Haven Brass Foundry, Grand Haven, Mich., a partnership
Filed Oct. 23, 1959, Ser. No. 848,431
4 Claims. (Cl. 137—451)

This invention relates to a ball cock valve and more particularly to a diaphragm actuated ball cock valve.

The ball cock valve is an article of manufacture which is in use in practically every home. Because of this, the ball cock valve is a highly competitive article. Also, the ball cock valve is involved in a plumbing system where it is desirable to have trouble free operation. It is further desirable to have a ball cock valve which will operate easily and which will shut off readily and silently when the proper level of water within the storage tank has been reached.

Therefore, it is an object of this invention to disclose a ball cock valve which is constructed of a minimum number of parts.

It is a further object of this invention to disclose a ball cock valve having a diaphragm which is self-sealing.

Still another object of this invention is to disclose a ball cock valve which is simple in operation and operates silently.

It is a further object of this invention to disclose a ball cock valve which can be manufactured economically and it is therefore a competitive article of manufacture.

These and other objects and advantages in the practice of this invention will be more apparent in the illustrations and description of a working embodiment of the invention, as hereinafter set forth.

Figure 1:
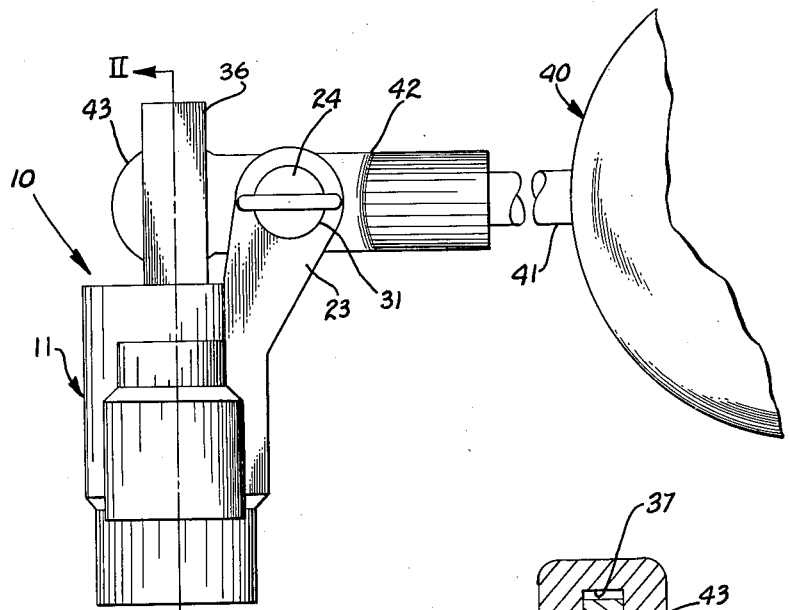
FIG. 1 is a side elevational view of the ball cock valve and showing portions of the float and float leverage mechanism.

The ball cock assembly is designated generally 10. The assembly 10 is composed of a body 11, valve insert 25, diaphragm 35, plunger 36 and lever 42, all of which are operative in or upon the body 11 of the ball cock assembly 10.

The body 11 is an elongated, generally cylindrical shaped member. The body 11 has a conduit passing longitudinally therethrough composed of a supply bore 12 at the lower end thereof, a body cavity 14 in the central portion thereof, and a plunger bore 13 in the other end thereof. The body cavity 14 is larger in diameter than the supply bore 12 and a ridge 16 is formed at the point where the supply bore ends and the body cavity begins which supports shoulders on the valve seat insert 25 to be explained more fully hereinafter. The plunger bore 13 is of a larger diameter than the body cavity 14 and a shoulder 15 is formed at the point where the body cavity 14 terminates and plunger bore 13 begins. The shoulder 15 provides a support for the diaphragm 35 which will be described in greater detail hereinafter.

A discharge housing 17 is formed integral with the body 11 and projects at an angle normal thereto. A body cavity outlet port 18 opens into an intermediate discharge channel 19 formed within the housing 17. An intermediate discharge channel outlet port 20 opens into the discharge channel 21 which is formed within the housing 17 transversely with respect to the intermediate discharge channel 19 and is directed downwardly. Directly opposite the discharge channel 21 is a threaded aperture 22 which extends through the housing 17 and opens into the intermediate discharge channel 19. The threaded aperture 22 is adapted to receive a conventional refill tube fitting (not shown).

Also formed integral with the body 11 is an upwardly and outwardly extending rib 23. The rib 23 extends an appreciable distance beyond the top of the main part of body 11. The outer extremity of the rib 23 is fork-shaped and contains transversely disposed apertures 31 extending therethrough. The rib 23 pivotally supports the float and its lever mechanism, to be explained more fully hereinafter.

A valve seat insert generally 25 is disposed within the conduit formed in the ball cock valve body 11. The valve seat insert 25 is an elongated, generally cylindrical-shaped member. The lower portion or trunk 30 of the valve seat insert is of a diameter greater than the supply bore 12. It is composed of a plastic material and the trunk dimension thereof is greater than the supply bore 12 by an amount sufficient to allow a proper pressure fit between the two members. Although the valve insert 25 disclosed herein is made of plastic and pressure fitted to the bore 12, it is to be understood that within the broadest aspect of the invention the valve insert could be made of metal and the trunk portion thereof threaded to the supply bore 12.

An outwardly extending shoulder or collar 26 is formed integral with the valve seat insert 25. The collar 26 seats on the ridge 16 formed in the body cavity 14 and assists in sealing the body cavity from the supply bore. The collar 26 also performs the more important function of positioning the valve seat insert 25 at the correct level within the valve body cavity. Thus, when the collar 26 of the valve seat insert 25 is properly positioned on the shoulder 16, the top of the valve seat insert 25 will be at the same level and in the same plane as the body cavity shoulder 15, previously described. The upper end surface of the valve seat insert 25 forms a valve seat 27. As just described, the valve seat 27 or top of the valve insert is in the same plane as the cavity shoulder 15. The valve seat insert 25 is provided with a passage 28 which extends longitudinally therethrough and provides a means for conveying liquid from the supply bore 12 to the body cavity 14 to be described more fully hereinafter.

The upper portion or neck 29 of the valve seat insert 25 is necked down or of a smaller diameter than the trunk 30 or collar 26 of the valve seat insert. The neck 29 is also of a smaller diameter than the body cavity 14. Thus, a space or void appears between the outside wall of the valve seat insert neck 29 and the wall of the body cavity 14. This space provides a passage for the liquid to the intermediate discharge channel 19 and the discharge channel 21.

Figure 2:
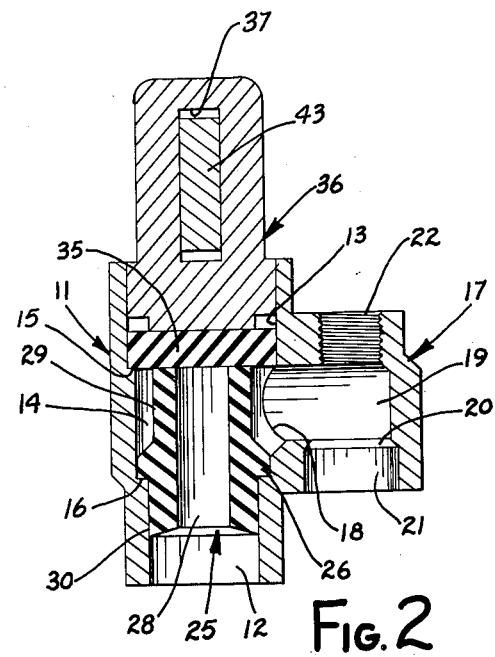
FIG. 2 is a cross sectional view of FIG. 1 taken along the line II—II of FIG. 1 and showing the diaphragm in the seated or valve closing position.

A flexible diaphragm normally constructed from a flexible material such as rubber is disposed within the plunger bore 13. The diaphragm 35 is of a lesser diameter than the plunger bore 13, and is allowed to float or reciprocate in the bore upon opening and closing the valve. The diaphragm 35 is fitted into the bore 13 so that the bottom edge thereof engages the plunger bore shoulder 15 and is positioned thereby. Although the diaphragm 35 must be enough smaller than the plunger bore 13 so as to slide or float within bore 13, it must be large enough so that when compressed between the plunger and water it will flex and expand forming a seal against the wall of bore 13 and prevent escape of fluid therefrom. This occurs when the valve is in the open position. When the diaphragm 35 is in the FIG. 2 or closed position, it must lie flat against the valve seat 27 so as to prevent escape of liquid from the passage 28. Since the plunger bore shoulder 15 is at the same level and in the same plane as the valve seat 27, the diaphragm 35 in the FIG. 2 position will lie in a plane which is normal to the longitudinal extent of the ball cock valve body 11.

A plunger generally 36 is disposed so as to reciprocate in the plunger bore 13. The plunger 36 is an elongated, generally cylindrical shaped member having an enlarged cylindrical collar portion 38 which is of a diameter slightly less than the plunger bore 13, and is adapted to be guided by the walls of the plunger bore. It has a base portion 39 which is slightly greater in diameter than the neck portion 29 of valve insert 35. The base 39 is adapted to abut the diaphragm 35, and force the diaphragm into seating position with valve seat 27.

The upper portion of the plunger 36 is provided with a rectangular shaped slot 37 which is disposed centrally within the body of the plunger and extends therethrough. The rectangular slot 37 receives a portion of the float and leverage mechanism now to be described.

A conventional ball float 40 is connected to a lever 42 by an intermediate link 41. The lever 42 is pivotally mounted on a pivot pin 24 which is supported by apertures 31 in body rib 23. The end of lever 42 opposite its connection with link 41 is shaped so as to pass through the plunger slot 37. This end of the lever is rounded at 43 to reduce friction between the plunger slot 37, when the lever pivots around pin 24 to reciprocate the plunger 36.

*Assembly*

The ball cock valve 10 is easily assembled. Initially, the ball cock body 11 is provided with a valve insert 35. The valve insert 35 is attached by passing it through the plunger bore 13 and body cavity 14, and forcing the trunk 30 thereof into supply bore 12 until the shoulder 26 engages the ridge 16. If the trunk 30 and supply bore 12 are threaded, the valve insert is threaded upon the supply bore 12.

The diaphragm 35 is then positioned in the plunger bore 13, and depressed until the lower edges thereof engage the plunger bore shoulder 15.

The plunger 36 is then positioned within the plunger bore 13, so that the base 39 thereof engages the diaphragm 35.

The end 43 of lever 42 is inserted in plunger slot 37, and directed between the forks of rib 23, where a pivot pin 24 is passed therethrough pivotally mounting the lever 42 on the rib 23. The ball cock valve is now assembled. The link 41 and float 40 are assembled to the lever 42 when the ball cock valve is installed as a new unit or as a replacement unit.

*Operation*

The supply bore 12 of the ball cock assembly 10 is attached to a source of supply in any well-known manner. The link 41 and float 40 are attached to lever 42 in a conventional manner, as is the refill tube (not shown) to the threaded aperture 22. The ball cock valve assembly 10 is now ready for operation.

Figure 3:
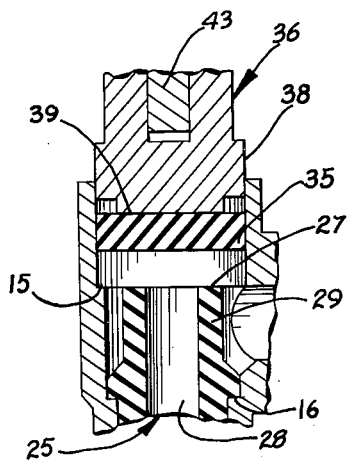
FIG. 3 is a segment of FIG. 2, showing the diaphragm in the open or unseated position.

For purposes of illustration, we will assume that the supply tank liquid level is initially low. Since the ball float 40 follows the level of the liquid, it will move downwardly pivoting the lever 42 about pin 24 and cause the end 43 thereof to move upwardly and carry the plunger 36 therewith. When the plunger 36 is in the raised position as shown in FIG. 3, pressure of the liquid from the supply source will cause the diaphragm 35 to float or slide up and allow liquid to flow from the passage 28 of valve insert 35 and spill over the valve seat 27 into the void between the body cavity and neck 29.

Since the intermediate discharge channel 19 opens into the body cavity 14 at port 18, the liquid will flow from the area between the neck 29 and body cavity wall 14 into the intermediate discharge channel 19. The liquid then passes through intermediate discharge channel outlet port 20 into discharge channel 21, which discharges the liquid into the supply tank.

The flow of liquid continues until the level thereof reaches a predetermined point in the supply tank. As the tank fills, the liquid level will eventually engage the ball float 40, and since the float 40 is buoyant, it will raise with the rising liquid. As the float 40 raises, it causes the lever 42 to pivot about pin 24, and the end 43 thereof forces the plunger 36 toward the valve seat 27. The movement of the ball float 40 is adjusted so that when the level of liquid within the supply tank has reached a predetermined point, the lever 42 will have forced the plunger 36 to position the diaphragm 35 in its seating position (FIG. 2), and thus terminate the flow of liquid from passage 28. With the seating of diaphragm 35 on valve seat 27, a cycle of operation has been completed. This cycle is repeated each time the supply tank is emptied.

From the above description, it is obvious that applicant has disclosed a ball cock valve assembly which is composed of a minimum number of parts. The plunger 36, lever 42 and diaphragm 35 are the only moving parts in the valve assembly. Thus, movement is reduced to a minimum. The diaphragm 35 is composed of a shock absorbent type material which will flex noiselessly and will absorb any noise of contact between itself and the plunger base 39. Thus, the ball cock assembly of valve 10 will be extremely silent in operation. Since the ball cock assembly 10 is composed of a minimum number of total parts and moving parts, it has a long maintenance free life of operation. Also, because of the simple construction, it is economical to manufacture. Since the diaphragm 35 is self-sealing, the body 11 of the ball cock valve assembly may be cast in a single piece unit, thereby further reducing cost of manufacture.

While a preferred embodiment of this invention has been described, it will be understood that further modifications and improvements may be made thereto. Such of these modifications and improvements as incorporate the principles of this invention are to be considered as included in the hereinafter appended claims unless these claims by their language expressly state otherwise.

I claim:

1. A ball cock valve comprising: a body having a cavity, a cylindrical supply bore and a cylindrical plunger bore communicating with said body cavity; a valve insert positioned within said body cavity and held by said supply bore, said valve insert having a trunk portion which is independently slidable within said supply bore, a shoulder which seats on a ridge formed in said body cavity and having a resilient portion forming a seal therewith, a necked down portion within said body cavity, and a valve seat associated with said necked down portion; a cylindrical disc seal member independently slidable within said plunger bore and adapted to engage said valve seat; plunger means reciprocally mounted within said plunger bore for seating said disc on said valve seat when in one position and allowing said disc to slide through said plunger bore to unseat when in another position; said disc being oriented generally in a plane perpendicular to said plunger bore; said disc when unseated being limited in sliding travel by said plunger, and being radially deformable in the plane of said disc by the dynamic pressure exerted on the face thereof by ordinary water pressure from said supply bore, to seal said plunger bore; discharge channel means communicating with said body cavity whereby liquid from said supply bore may be discharged via the body cavity and discharge channel when said diaphragm is in the unseated position.

2. A ball cock valve comprising: a unitary body having a cavity, said cavity including a supply bore and a plunger bore, said supply bore having a radially inwardly extending shoulder therein, a valve insert slidably and sealingly fittable in said supply bore and having an integral valve seat on one extremity thereof, said insert having a radially outwardly extending shoulder on its outer periphery, said insert shoulder resting on said supply bore shoulder, an independent radially deformable disk member in said plunger bore and adjacent said valve seat, said disc being oriented generally in a plane perpendicular to said plunger bore and being slightly smaller in diameter than said plunger bore to allow free floating movement therein and radially deformable in the plane of the disc by dynamic pressure exerted on the face thereof by ordinary water pressure to serve as a bore seal under liquid pressure, and plunger means adjacent said disc in said plunger bore whereby said plunger may be caused to force said disc against said valve seat to prevent liquid flow, and whereby said plunger may be withdrawn to allow floating movement of said disc and thus flow of liquid.

3. A ball cock valve comprising: a unitary body having a cavity, said cavity including a supply bore and a plunger bore, said supply bore having a radially inwardly extending shoulder therein, a resilient valve insert in said supply bore having an integral resilient valve seat on one extremity thereof, said insert having a radially upwardly extending shoulder on its outer periphery, said insert shoulder resting on said supply bore shoulder, a portion of said insert having a greater diameter than said supply bore whereby a press fit results, an independent resilient disk member in said plunger bore and adjacent said valve seat, said disc being oriented generally in a plane perpendicular to said plunger bore and being slightly smaller in diameter than said plunger bore to allow free floating movement therein and being radially deformable in a plane of the disc by the dynamic pressure exerted on the face thereof by ordinary water pressure to serve as a bore seal under ordinary liquid pressure, said plunger bore having a portion of reduced diameter in the plane containing the valve seat thereby defining an annular shoulder, and plunger means adjacent said disc in said plunger bore whereby said plunger may be caused to force said disc against said valve seat to prevent liquid flow, and whereby said plunger may be withdrawn to allow floating movement of said diaphragm and thus flow of liquid.

4. A ball cock valve comprising: a body having a cavity, a supply bore, and a cylindrical plunger bore; a valve element within said supply bore and having a necked down portion extending within said body cavity and including a valve seat on the end of said necked down portion; a cylindrical disc having a diameter slightly smaller than said plunger bore to be freely slidably movable within said plunger bore and being oriented generally in a plane perpendicular to said plunger bore; said plunger means reciprocably mounted within said plunger bore; said plunger means being capable of sliding said disc through said plunger bore into sealing engagement with said valve seat, and of allowing said disc to move through said plunger bore away from said valve seat under the influence of water pressure from said supply bore; said disc being resilient and radially, deformably, expandable in a plane of said disc by the dynamic pressure exerted on the face thereof by ordinary water pressure when said disc is in abutting relationship with said plunger means away from said valve seat to seal said plunger bore; and discharge channel means communicating with said body cavity, whereby liquid from said supply bore may be discharged.

References Cited in the file of this patent

UNITED STATES PATENTS

| | | |
|---|---|---|
| 2,164,934 | McGrath | July 4, 1939 |
| 2,198,238 | Adams | Apr. 23, 1940 |
| 2,210,046 | Schubring | Aug. 6, 1940 |
| 2,294,785 | Langdon | Mar. 2, 1943 |
| 2,318,236 | Layton | May 4, 1943 |
| 2,869,578 | Crockett | Jan. 20, 1959 |

FOREIGN PATENTS

| | | |
|---|---|---|
| 50,257 | Switzerland | Sept. 15, 1910 |
| 742,454 | France | Dec. 27, 1932 |